(12) United States Patent
Smith et al.

(10) Patent No.: US 8,365,880 B2
(45) Date of Patent: Feb. 5, 2013

(54) COLLET CONTROLLED SLACK ADJUSTER

(75) Inventors: Benjamin J. Smith, Moore, SC (US); Frank J. Korleski, Simpsonville, SC (US)

(73) Assignee: Wabtec Holding Corp., Wilmerding, PA (US)

(*) Notice: Subject to any disclaimer, the term of this patent is extended or adjusted under 35 U.S.C. 154(b) by 1268 days.

(21) Appl. No.: 12/094,168

(22) PCT Filed: Mar. 21, 2006

(86) PCT No.: PCT/US2006/010184
§ 371 (c)(1),
(2), (4) Date: Jun. 17, 2008

(87) PCT Pub. No.: WO2007/067199
PCT Pub. Date: Jun. 14, 2007

(65) Prior Publication Data
US 2008/0314702 A1 Dec. 25, 2008

Related U.S. Application Data

(60) Provisional application No. 60/742,362, filed on Dec. 5, 2005.

(51) Int. Cl.
*F16D 65/54* (2006.01)
(52) U.S. Cl. ............... 188/196 P; 188/196 R; 188/197; 188/198; 188/67
(58) Field of Classification Search .............. 188/196 R, 188/197, 198, 196 P, 67, 265, 79.57
See application file for complete search history.

(56) References Cited

U.S. PATENT DOCUMENTS

| | | | |
|---|---|---|---|
| 3,589,480 A | 6/1971 | Axelsson et al. | |
| 4,433,758 A | 2/1984 | Crossman | |
| 4,585,097 A | 4/1986 | Severinsson | |
| 4,649,804 A * | 3/1987 | Oberlander | 92/63 |
| 4,676,346 A | 6/1987 | Barberis | |
| 4,762,017 A * | 8/1988 | Jaksic | 74/500.5 |
| 4,895,228 A | 1/1990 | Washbourn et al. | |
| 5,423,401 A | 6/1995 | Noah et al. | |
| 5,848,550 A | 12/1998 | Cathcart et al. | |
| 5,937,974 A | 8/1999 | Cathcart et al. | |
| 6,397,986 B2 | 6/2002 | Moore | |

FOREIGN PATENT DOCUMENTS

RU 2153610 C1 7/2000

* cited by examiner

*Primary Examiner* — Robert A Siconolfi
*Assistant Examiner* — James Hsiao
(74) *Attorney, Agent, or Firm* — The Webb Law Firm

(57) ABSTRACT

A slack adjuster for a fluid-actuated brake comprises a slack adjuster collet (24) having a tubular skirt and an enlarged ring section. The enlarged ring section has opposed axial stop faces notched therein that define a conical lift surface facing the tube axis. A forward stop face has a conical or beveled surface arranged to engage the conical or beveled surface on one stop face of the collet when the collet carried by the actuator rod reaches the forward stop face and a retraction stop face has a conical or beveled surface arranged to engage the conical or beveled surface on the other stop face of the collet when the collet carried by the actuator rod reaches retraction stop face. The conical or beveled surfaces are configured so that when they engage, the force of the collet on the push rod is reduced.

7 Claims, 4 Drawing Sheets

COLLET CONTROLLED SLACK ADJUSTER

BACKGROUND OF THE INVENTION

1. Field of the Invention

The present invention relates to slack adjusters which are devices used with fluid pressure actuated brakes to accommodate the wear of brake shoes and the like so that the length of the brake actuation stroke remains the same as wear takes place.

2. Description of Related Art

Fluid-actuated brakes with slack adjusters are well known in the art as seen, for example, in the following: U.S. Pat. Nos. 4,676,346; 4,895,228; 5,423,401; 5,848,550; 5,937,974; and 6,397,986. Typically, fluid-actuated brakes have a housing enclosing a piston and cylinder. The piston drives a connecting linkage that is generally tubular. Within the tubular linkage is positioned a push rod that can slide within the tubular linkage. Some type of clutching apparatus is positioned between the tubular linkage and the push rod for driving the rod in a brake-actuating direction but permitting the rod to retreat into the tubular linkage. Also associated with the rod is a slack adjuster comprising a movable stop normally clutched relative to the push rod to restrict the retreat of the push rod by engaging a stop face on the tubular linkage or the housing. The stop must be capable of unclutching and moving along the push rod in the direction opposite the brake-actuation direction if the rod moves beyond its prior normal travel due to brake wear. At such time, the stop is moved by engaging a stop face associated with the housing. It must also be possible to manually force the push rod to retreat into the tubular linkage at the time of brake pad replacement. This requires the unclutching of the stop.

Stops are generally of two types. In one type, the push rod has external threads and the stop comprises a nut that turns on the push rod threads. Clutching action is caused by restricting rotation of the nut relative to the rod as shown, for example, in U.S. Pat. Nos. 4,676,346 and 4,895,228.

In the other type, the push rod has threads or teeth and the stop comprises a collet that surrounds the rod and frictionally grips the teeth. The collet is a tube that has an inner diameter that abuts and squeezes the teeth of the push rod. Axial slits in the tube wall allow slight radial expansion of the tube permitting it to ride over the teeth of the push rod. At one end of the collet tube, a ring of enlarged diameter is located. Axial faces on the ring serve as stop faces for engaging stops associated with the housing or tubular linkage. If sufficient axial force is applied, the collet will unclutch and move axially along the push rod. Collet-type stops in slack adjusters are disclosed, for example, in U.S. Pat. Nos. 5,423,401 and 5,937,974. The slack adjuster collets disclosed in these patents have slack adjuster collets with an enlarged ring end positioned axially away from the brake. The squeezing force of the collet on the teeth of the push rod is the same no matter the axial position of the collet relative to the push rod.

SUMMARY OF THE INVENTION

Briefly, according to the present invention, a slack adjuster for a fluid-actuated brake comprises a housing enclosing a piston cylinder, a piston and a tubular linkage extending from the piston for actuating a brake, a push rod extending into the tubular linkage, and a device for clutching the tubular linkage and push rod when driven in a brake-actuating direction. The slack adjuster comprises a collet applying a squeezing force on the push rod. A retraction stop face and a forward stop face are fixed relative to the housing. The collet has a tubular skirt section having a tube axis and an enlarged fixed ring section at one end of the tubular skirt section. The ring section has opposed axial stop faces that are generally perpendicular to the tube axis. These opposed faces each have a notch therein that defines a conical or beveled surface facing the tube axis. The forward stop face has a conical or beveled surface arranged to engage the conical or beveled surface on one stop face of the collet when the collet carried by the actuator rod reaches the forward stop face. The retraction stop face has a conical or beveled surface arranged to engage the conical or beveled surface on the other stop face of the collet when the collet carried by the actuator rod reaches the retraction stop face. The conical or beveled surfaces are configured so that when they engage, the collet expands and the force of the collet on the push rod is reduced. Most preferably, the tubular skirt section of the collet extends axially toward the piston.

Preferably, the slack adjuster tubular skirt section and the enlarged ring section of the collet have connected axial grooves or slits extending along and through the tubular wall to near the end of the of the tubular skirt section.

Preferably, the conical or beveled surfaces associated with all stop faces form substantially the same angle with the tube axis and the conical or beveled surfaces on the collet are spaced closer to the tube axis than the conical or beveled surfaces on the retraction and forward stops.

Most preferably, the fixed ring section of the slack adjuster collet has a slightly smaller internal diameter than the tubular skirt section forcing part of the wall of the skirt to be elastically bent to thereby place a squeezing force on the push rod.

BRIEF DESCRIPTION OF THE DRAWINGS

Further features and other objects and advantages will become clear to those of ordinary skill in the art from the following detailed description made with reference to the drawings in which.

DESCRIPTION OF THE PREFERRED EMBODIMENTS

Figure 1:
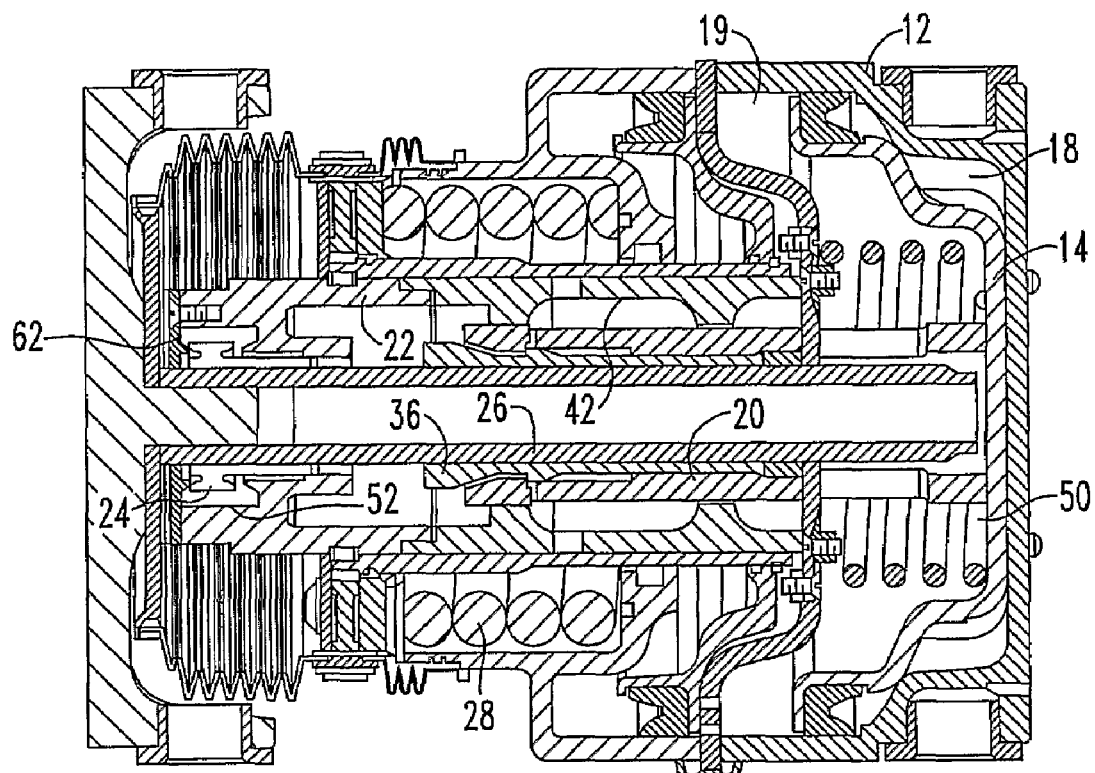
FIG. 1 is an assembly drawing in section illustrating a spring-applied parking brake and service brake having a collet-style slack adjuster according to the present invention.

Referring to FIG. 1, there is shown a spring-applied parking brake and service brake having a collet-style slack adjuster according to the present invention. The overall operation of the brake is of background importance to the present invention. Except for the improvement in the slack adjuster, the operation of the parking brake is exactly as described in U.S. Pat. No. 5,937,974 which is incorporated herein by reference. In the following description, the brake pad end of the parking brake is referred to as the forward end and the piston end as the aft end. The brake comprises a housing 12 that encloses a piston cylinder 18 and a service brake piston 14. The service brake piston 14 is fluid actuated to apply the brakes and is retracted by coil spring 50. The housing 12 also encloses a second piston cylinder 19 and retracting piston 17 for retracting the parking brake activated by large spring 28. The service brake piston 14 drives a tubular linkage 20. A threaded or toothed push rod 26 slides within the tubular linkage 20 and is clutched by actuation collet 36 which has a beveled or conical surface for abutting a complementary conical surface on the tubular linkage. Thus, on the service brake application stroke, the actuation collet 36 is driven to clutch the push rod 26 so that both tubular linkage and push rod move together. On retraction, the tubular linkage is unclutched from the push rod.

Extending from the parking brake retracking piston is a tubular linkage 20 which captures a two-part intermediate sleeve comprised of aft sleeve 42 and forward sleeve 22. The release of fluid pressure in second piston cylinder 19 allows the large spring 28 to transfer force to the brake pad attached to the end of the push rod 26 for effecting a parking brake force on the brake pad.

To this point, what has been described is the same as set forth in U.S. Pat. No. 5,937,974 using identical numbers for corresponding elements. Hereafter, the description is of the improvements according to the present invention.

Figure 2:
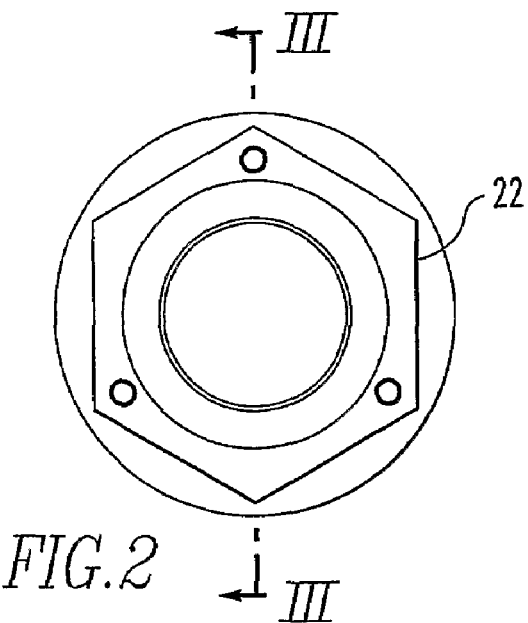
FIG. 2 is an end view of a forward sleeve portion of the slack adjuster shown in FIG. 1.
Figure 3:
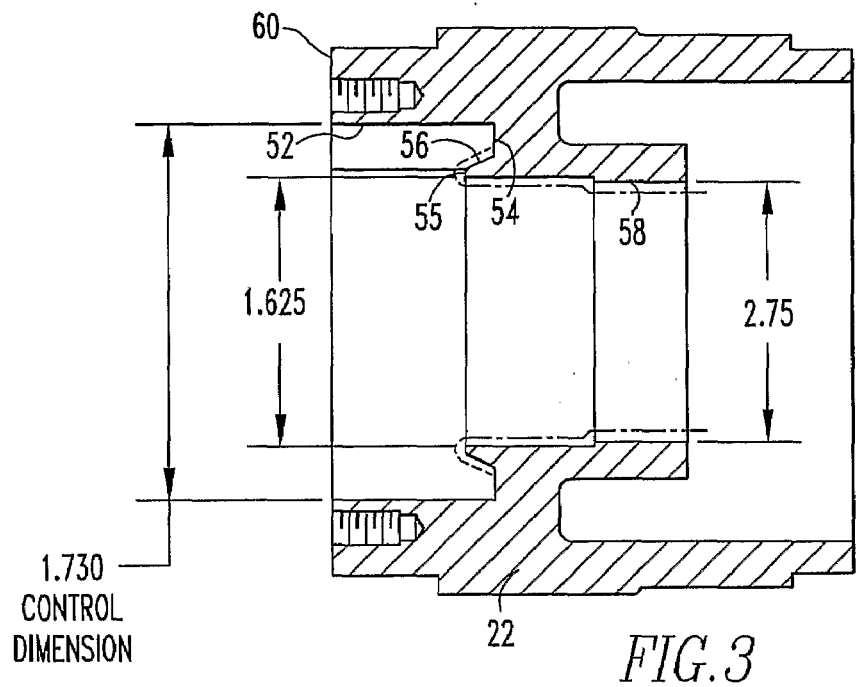
FIG. 3 is a section view taken along lines III-III of FIG. 2.

Referring to FIGS. 2 and 3, the forward sleeve 22 has a unique configuration. The forward sleeve has an enlarged inner cylindrical wall 52 that is larger than the diameter of the push rod 26, defining a space for accommodating a slack adjuster collet 24 (to be described). At the aft end of the space, there is a radial end wall or aft stop face 54 with a projecting ring 55 defined by a conical aft lift surface 56 extending from an inner cylindrical surface 58. The inner cylindrical surface 58 is greater than the cylindrical skirt of the slack adjuster collet 24, which is then, in turn, slightly larger than the push rod. The conical aft lift surface 56 increases in diameter moving aft.

The forward end of the forward sleeve 22 has a radial end surface 60 with threaded holes for receiving fasteners for holding the end plate 62.

Figure 4:
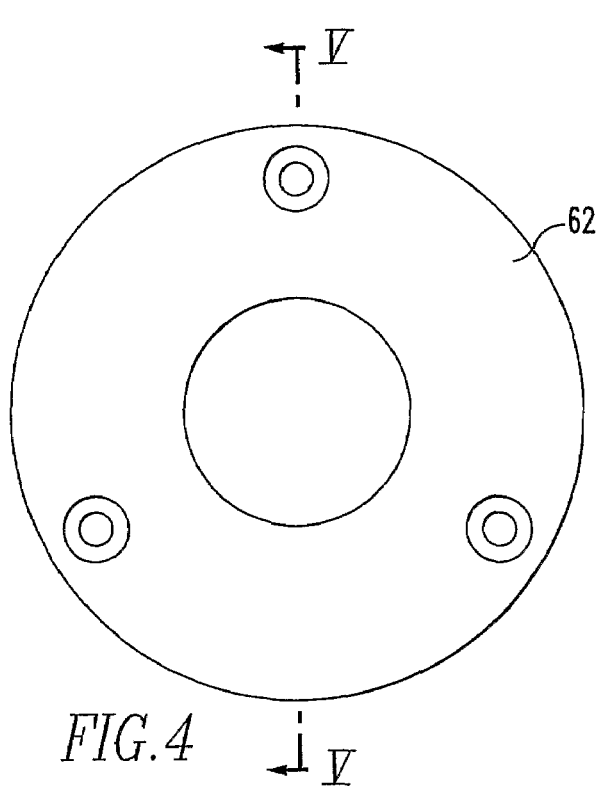
FIG. 4 is a part drawing showing the end plate in end view for the slack adjuster shown in FIG. 1.
Figure 5:
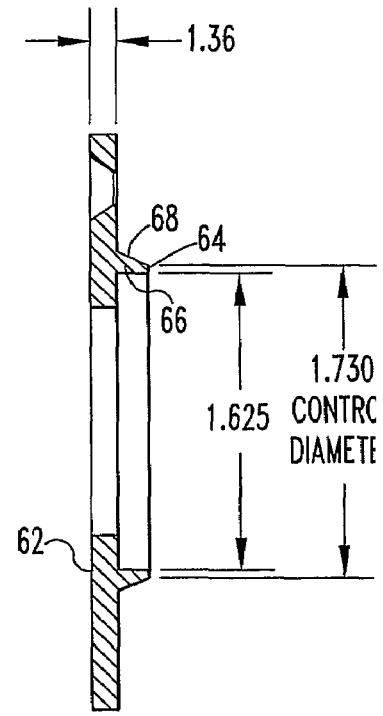
FIG. 5 is a section view taken along lines V-V in FIG. 4.
Figure 6:
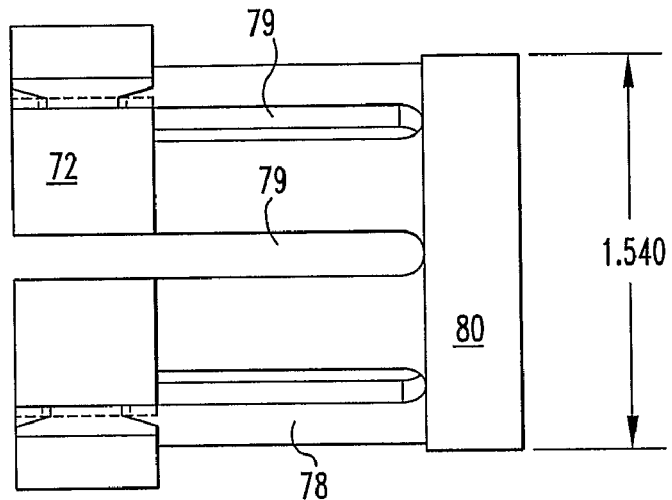
FIG. 6 is a side view of a collet for the slack adjuster shown in FIG. 1.
Figure 7:
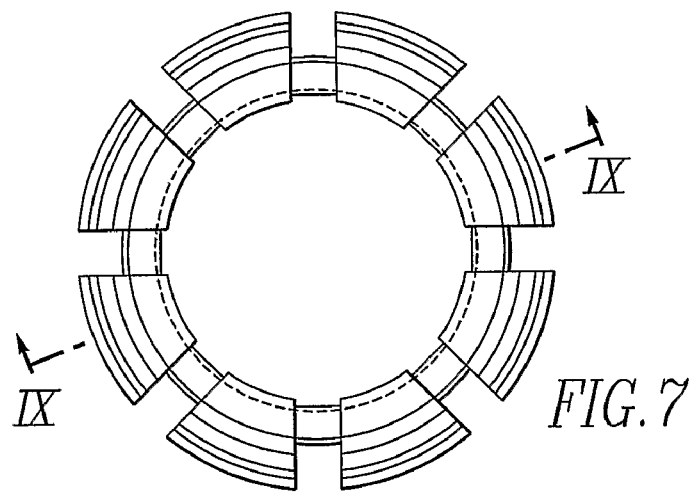
FIG. 7 is a right side view of the collet.
Figure 8:
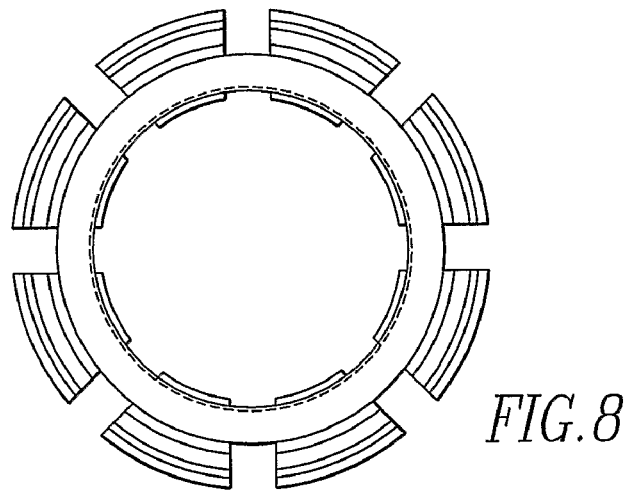
FIG. 8 is a left side view of the collet.
Figure 9:
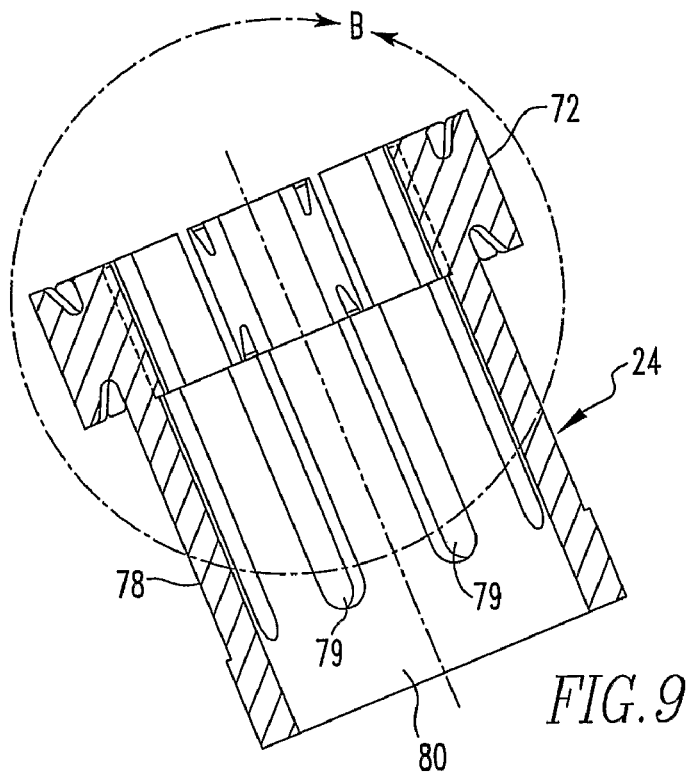
FIG. 9 is a section view taken along line IX-IX in FIG. 7.
Figure 10:
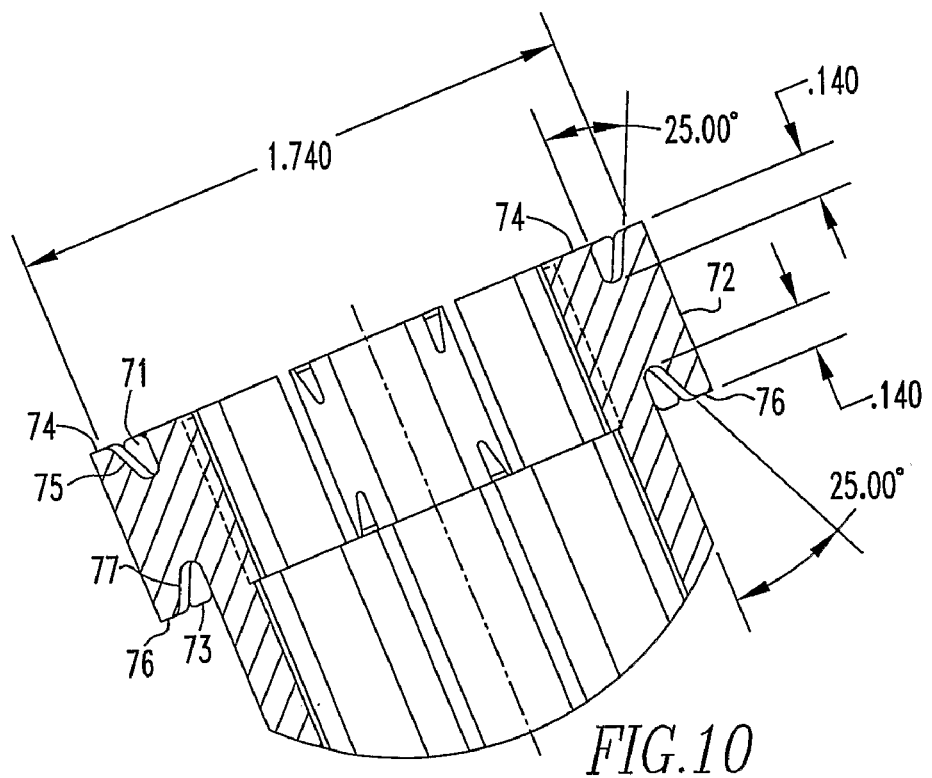
FIG. 10 is a detailed section of the collet showing the grooves with conical lift surfaces essential to the practice of the present invention.

Referring now to FIGS. 4 and 5, there is shown end plate 62 which can be secured to the radial end surface 60 of the forward sleeve 22. The end plate 62 serves as a forward stop face for limiting the forward travel of the slack adjuster collet 24 and the push rod 26. The end plate has a ring 64 projecting from the surface of the end plate. The ring 64 has a cylindrical surface 66 having a diameter greater than the diameter of the push rod 26. In other words, the cylindrical surface 66 is greater than the cylindrical diameter opposite the opening bevel on the slack adjuster collet for the output stroke which is then, in turn, larger than the push rod. The ring 64 has a conical lift surface 68 extending between the cylindrical surface of the ring and the aft face of the end plate 62. The conical surface has an increasing diameter moving forward to the end plate 62.

Referring to FIGS. 6, 7, 8, 9, and 10, the slack adjuster collet 24 is a tubular structure having an internal cylindrical surface that clutches the threads or teeth of the push rod 26 and can be axially repositioned on the push rod during slack adjustment. The slack adjuster collet has a cylindrical skirt 78 and an enlarged fixed ring 72 at one end. The fixed ring 72 has two radial end surfaces defining stop face 74 and stop face 76. These stop faces cooperate with end plate 62 or stop face 54 on the forward sleeve 22. The forward and aft stop surfaces 74, 76 each have grooves 71, 73 with conical lift surfaces 75, 77 facing radially inward. The lift surfaces 75, 77 have diameters that increase moving inward from their respective stop faces. The skirt of the slack adjuster collet has axial grooves or slits 79 extending through the cylindrical wall of the skirt 78 and the fixed ring 72 (see FIG. 9). The end 80 of the skirt 78 opposite the fixed ring 72 is not grooved or slit. The grooves 79 allow for a slight expansion of the grooved sections of the ring and skirt. The cylindrical wall portions between the slits serve as leaf springs when bent radially outward placing their outer surface in compression and their inner surface in tension. According to a preferred aspect of the present invention, the internal diameter of the fixed ring 72 is slightly less than the internal diameter of the skirt 78 and slightly less than the external diameter of the push rod 26. Thus, when the adjuster collet is placed on the push rod, the grooved portion of the skirt and the ring section are elastically bent away from the rod such that the fixed ring places a clutching force on the push rod.

The operation of the slack adjuster is as follows. When due to the wear of the brake shoe the push rod 26 moves past its normal forward position, the forward stop face 74 of the collet 24 abuts the end plate 62 and the collet is forced aft along the push rod 26. When the forward stop face 74 on the slack adjuster collet reaches the end plate 62, the ring 64 projecting from the end wall enters the groove 71 in the stop face 74, the conical surfaces 68 and 75 abut, and the fixed ring 72 is expanded away from the push rod thus unclutching the slack adjuster collet from the push rod. The ring 64 and groove 71 are so configured that after the conical surfaces 68 and 75 abut the ring can continue to move into the groove. This continued movement expands the fixed ring 72 away from the push rod 26. This enables the collet to be moved aft along the adjusting rod without significantly diminishing the force of the push rod transferred to the brake pads. This repositioning of the adjuster collet then restricts the withdrawal of the push rod during brake release when the other stop face 76 on the fixed ring abuts the stop face 54 on the forward sleeve 22. The force of the retracting spring pulling the push rod aft is not sufficient to force the projecting ring 55 into the groove 73. Hence, the adjuster collet does not become unclutched.

During maintenance of the brake, for example, replacing brake shoes, it is necessary to force the push rod aft. With manual force on the push rod, the projecting ring 55 on the stop face 54 on the forward sleeve 22 enters the groove 73 in the aft stop face 76 of the ring and lift surfaces 56 and 77 abuts spreading the slack adjuster collet, thus unclutching the collet from the push rod.

The operation of the slack adjuster collet is similar to that which has been used in other collet actuator designs in that it clutches and unclutches the actuator rod and moves axially along the push rod under certain conditions. However, the slack adjuster collet according to the present invention has additional advantages.

The collet has a conical or beveled surface that aids in the opening of the collet during the output stroke of the actuator. The conical or beveled surface in conjunction with placing the skirt of the collet in the forward direction increases the efficiency of the output stroke by decreasing drag of the collet on the push rod.

As described herein, a number of the parts have circular cylindrical internal or external surfaces, for example, the slack adjuster collet, the forward sleeve 22, etc. It is within the contemplation of the present invention that these surfaces could be cylindrical surfaces in the sense of being surfaces traced by a straight line parallel to an axis and intersecting a fixed curve. The fixed curve might, for example, be an octagon. In such case, the above-described conical surfaces would be replaced by beveled plane surfaces.

The improved slack adjuster collet described herein allows the designer to more easily control the amount of force that is required for push rod retraction. Since the portion of the collet clutching the push rod is lifted away from the push rod, the friction between the collet and the teeth of the push rod is reduced. The force needed to move the collet forward along the push rod during maintenance can be better controlled by the design of the interacting conical or beveled surfaces rather than merely relying upon friction. The angle of the interacting surfaces will control the axial force needed to unclutch the slack adjuster collet.

By having the skirt of the collet extending in the aft direction, the moment arm that the lifting surfaces act upon for effecting unclutching during maintenance is shorter than the moment arm that the lifting surfaces act upon during braking. The difference in the length of the moment arm is the width of the ring on the collet. This means a greater axial force will be required for unclutching during maintenance. This is desirable to prevent the push rod from slipping during air release after a service brake stroke. If slipping took place, the slack adjuster would fail to take up slack resulting in poor performance of the brake.

Having thus defined our invention in the detail and particularity required by the Patent Laws, what is desired protected by Letters Patent is set forth in the following claims.

The invention claimed is:

1. In a slack adjuster for a fluid-actuated brake comprising a housing enclosing a piston cylinder, a piston and a tubular linkage extending from said piston for actuating a brake, a push rod extending into said tubular linkage, and means for clutching the tubular linkage and push rod when driven in a brake actuating direction, said slack adjuster comprising a collet applying a squeezing force on said actuator rod, a retraction stop face and a forward stop face, said stop faces fixed relative to the housing, the improvement comprising:

said collet having a tubular skirt section having a tube axis and an enlarged ring section at one end of the tubular skirt section, said enlarged ring section having opposed axial stop faces that are generally perpendicular to the tube axis, said opposed axial stop faces each having a notch therein that defines a conical or beveled surface facing the tube axis;

said forward stop face having a conical or beveled surface arranged to engage the conical or beveled surface on one stop face of the collet when the collet carried by the actuator rod reaches the forward stop face;

said retraction stop face having a conical or beveled surface arranged to engage the conical or beveled surface on the other stop face of the collet when the collet carried by the actuator rod reaches the retraction stop face; and the conical or beveled surfaces being configured so that when they engage, the force of the collet on the push rod is reduced.

2. The slack adjuster according to claim 1, wherein the tubular skirt section of the collet extends axially toward the piston.

3. The slack adjuster according to claim 1, wherein the tubular skirt section and the expanded ring section of the collet have connected axial grooves extending along and through the tubular wall to near the end of the of the tubular skirt section.

4. The slack adjuster according to claim 1, wherein the conical or beveled surfaces associated with all stop faces form substantially the same angle with the tube axis.

5. The slack adjuster according to claim 4, wherein the conical or beveled surfaces on the collet are spaced closer to the tube axis than the conical or beveled surfaces on the retraction and forward stops.

6. The slack adjuster according to claim 1, wherein the ring section of the slack adjuster collet has a slightly smaller internal diameter than the tubular skirt section forcing part of the wall of the skirt to be elastically bent to thereby place a squeezing force on the push rod.

7. The slack adjuster according to claim 1, wherein the push rod is threaded or toothed.

* * * * *

UNITED STATES PATENT AND TRADEMARK OFFICE
CERTIFICATE OF CORRECTION

PATENT NO. : 8,365,880 B2
APPLICATION NO. : 12/094168
DATED : February 5, 2013
INVENTOR(S) : Benjamin J. Smith et al.

It is certified that error appears in the above-identified patent and that said Letters Patent is hereby corrected as shown below:

In the Claims:

Column 6, Line 22, Claim 3, after "near the end" delete "of the"

Signed and Sealed this
Twenty-third Day of April, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,365,880 B2  Page 1 of 1
APPLICATION NO. : 12/094168
DATED : February 5, 2013
INVENTOR(S) : Smith et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1281 days.

Signed and Sealed this
First Day of September, 2015

Michelle K. Lee
*Director of the United States Patent and Trademark Office*